United States Patent
Beelen et al.

(10) Patent No.: US 9,868,845 B2
(45) Date of Patent: Jan. 16, 2018

(54) OIL EXTENDED ETHYLENE-ALPHA-OLEFIN-NON-CONJUGATED DIENE COPOLYMER

(71) Applicant: LANXESS Elastomers B.V., Geleen (NL)

(72) Inventors: Henri Jacob Hubert Beelen, Heerlen (NL); Ulrich Frenzel, Dormagen (DE); Claus Wrana, Cologne (DE); Christoph Goegelein, Cologne (DE)

(73) Assignee: ARLANXEO NETHERLANDS B.V., Geleen (NL)

( * ) Notice: Subject to any disclaimer, the term of this patent is extended or adjusted under 35 U.S.C. 154(b) by 0 days.

(21) Appl. No.: 14/898,557

(22) PCT Filed: Jun. 24, 2014

(86) PCT No.: PCT/EP2014/063209
§ 371 (c)(1),
(2) Date: Dec. 15, 2015

(87) PCT Pub. No.: WO2014/206952
PCT Pub. Date: Dec. 31, 2014

(65) Prior Publication Data
US 2016/0152796 A1  Jun. 2, 2016

(30) Foreign Application Priority Data
Jun. 25, 2013 (EP) .................. 13173470

(51) Int. Cl.
*C08K 5/01* (2006.01)
*C08K 5/00* (2006.01)
*C08L 23/16* (2006.01)

(52) U.S. Cl.
CPC .......... *C08K 5/01* (2013.01); *C08K 5/0025* (2013.01); *C08L 23/16* (2013.01)

(58) Field of Classification Search
CPC .......... C08K 5/01; C08K 5/00; C08K 5/0025
USPC .................................................... 524/554
See application file for complete search history.

(56) References Cited

U.S. PATENT DOCUMENTS

| | | | |
|---|---|---|---|
| 5,242,971 A * | 9/1993 | Nakahama | C08L 21/00 524/482 |
| 5,610,217 A | 3/1997 | Varnell et al. | |
| 5,710,218 A | 1/1998 | Nakahama et al. | |
| 6,060,572 A * | 5/2000 | Gillis | C08F 10/00 526/127 |
| 6,251,977 B1 | 6/2001 | Georget et al. | |
| 6,465,584 B1 | 10/2002 | Evens et al. | |
| 6,693,145 B2 | 2/2004 | Graf et al. | |
| 6,716,931 B2 | 4/2004 | Koshiba et al. | |
| 2003/0149147 A1* | 8/2003 | Graf | C08K 3/04 524/232 |
| 2003/0149188 A1 | 8/2003 | Koshiba et al. | |
| 2010/0105851 A1 | 4/2010 | Van Doremaele et al. | |
| 2011/0021732 A1 | 1/2011 | Windmuller et al. | |

FOREIGN PATENT DOCUMENTS

| | | |
|---|---|---|
| JP | 2002146125 A2 | 5/2002 |
| JP | 206193753 A2 | 7/2006 |
| WO | 0621309 A1 | 10/1994 |

OTHER PUBLICATIONS

Gurp, M.V., "Time-Temperature Superposition for Polymeric Blends", DSM Research, Geleen, The Netherlands 6160, 1998, pp. 5-8.
Trinkle, S., Van Gurp-Palmen-plot: A Way to Characterize Polydispersity of Linear Polymers, Rheol Acta (2001), 40, Springer-Verlag, 79104 Freiburgh i., Br., Germany, pp. 322-328.
"Collection of Petrochemicals and Test Methods and Standards", Science and Technology Development Department, SINNOPEC, China Petrochemical Press, Apr. 30, 2005, pp. 133-134.
International Search Report from co-pending Application PCT/EP2014/0633209, dated Jul. 24, 2014, 3 pages.
China Search Report from co-pending Application 2014800367659, dated Jun. 24, 2014.

* cited by examiner

Primary Examiner — Deve E Valdez

(57) ABSTRACT

The invention relates to an oil extended ethylene-a-olefin-non-conjugated-diene copolymer composition consisting of i) 100 parts of at least one ethylene-a-olefin-non-conjugated-diene copolymer having —a weight average molecular weight (Mw) of at least 300,000 g/mol. —an intrinsic viscosity higher than 4, preferably higher than 4.2 measured in Xylene at 70° C. and —a polydispersity (Mw/Mn) smaller than 3, preferably smaller than 2.8, in particular smaller than 2.6; ii) 30 to 70 parts by weight per 100 parts by weight of the ethylene-a-olefin-non-conjugated-diene copolymer (i) of an extender oil and iii) up to 5 parts by weight per 100 by weight of the ethylene-a-olefin-non-conjugated-diene copolymer (i) of auxiliary agents, whereby the oil extended copolymer composition has a phase angle $\overline{O}_{min}$ of lower than 2.5.

16 Claims, 1 Drawing Sheet

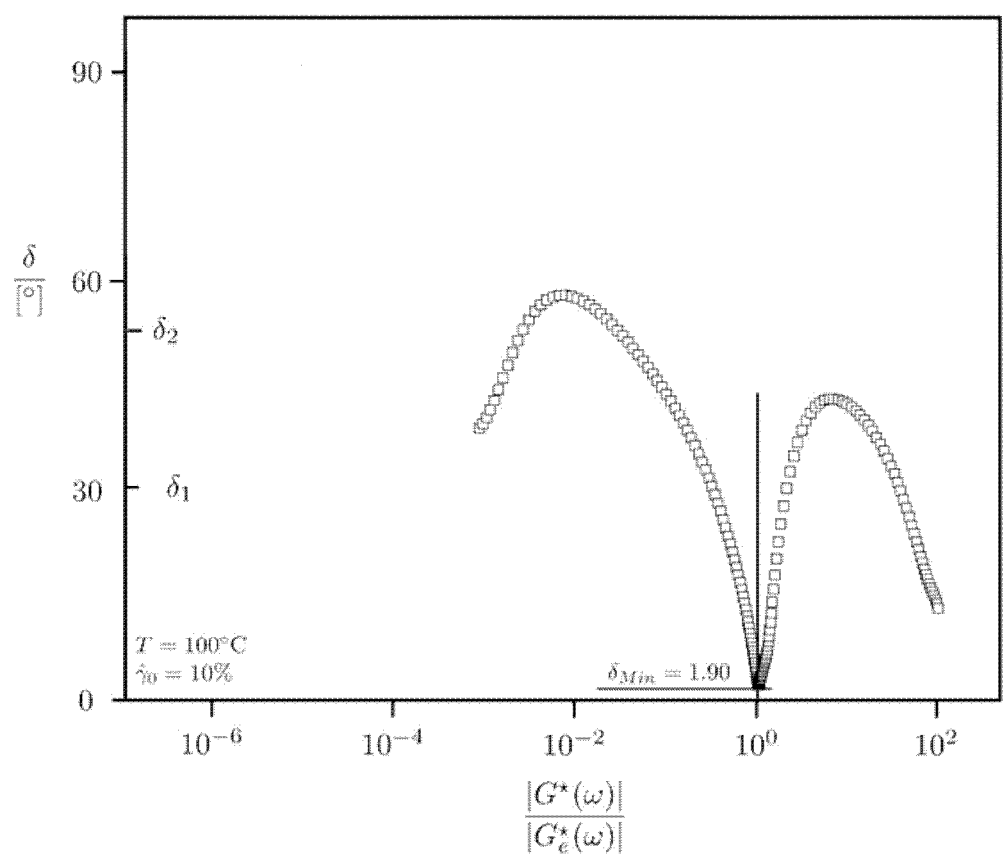

OIL EXTENDED ETHYLENE-ALPHA-OLEFIN-NON-CONJUGATED DIENE COPOLYMER

The present invention relates to a certain oil extended ethylene-α-olefin-non-conjugated diene copolymer composition, a vulcanizable rubber composition containing the same and its vulcanized article, in particular an engine mount or other articles intended for used in dynamic applications such as flexible couplings and torsional vibration dampers but also belts, muffler hangers, air springs and bridge bearings.

Ethylene-α-olefin elastomers, particularly ethylene-propylene-diene terpolymers (EPDM) are recognized as excellent general-purpose elastomers that are useful in a wide variety of applications.

EPDM is consisting of ethylene and propylene repeating units with a smaller amount of diene units to introduce unsaturation and thus facilitate crosslinking of the polymer chains. Due to the substantial absence of unsaturation in the polymer backbone, EPDM rubbers exhibit superior oxidation, ozone and weather resistance, as well as better heat aging compared to conjugated diene rubbers. In addition, EPDM rubbers compare favorably in cost to many other elastomers and tolerate high concentrations of fillers and oil while maintaining good physical properties. For these reasons, ethylene-α-olefin elastomers, in particular EPDM, have been widely used either alone or blended with other elastomers in numerous applications including e.g. hoses, seals, gaskets, roofing materials and weather strips.

A known disadvantage of EPDM materials however, is their inferior performance in dynamic applications. Dynamic applications in this respect are those applications in which shaped parts are subjected to repeated stress forces and dynamic loading. Unfortunately, ethylene-alpha-olefin elastomers are known to exhibit only moderate dynamic fatigue resistance, wear resistance, tensile strength and modulus in such applications. Some of these properties even tend to be in opposition, making improved rubber compounds difficult to achieve. For example, increased crosslink density of cured rubber generally helps reduce compression set, but also results in reduced tear strength.

For EPDM polymers, peroxide curing is commonly used in place of sulfur curing to improve further the heat-aging properties, decrease compression set and improve adhesion to treated and untreated textiles. Unfortunately, the dynamic properties of peroxide cured rubbers are generally even worse than of sulfur-cured rubber. This fact further reduces the applicability of EPDM compounds in dynamic applications. This invention provides a solution also for peroxide cured goods.

As a consequence, use of EPDM in dynamic applications, such as power transmission belting, flat belting, flexible couplings, torsional vibration dampers, air springs, engine mounts and the like, has therefore been rather limited, especially for peroxide-cured compounds for instance in WO96/13544.

These types of parts are instead most commonly manufactured using elastomers with superior dynamic mechanical properties such as natural rubber, styrene-butadiene rubber, polychloroprene and blends thereof. In particular, natural rubber performs much better in dynamic applications due to its strain-induced crystallization, but it is lacking in heat and ozone resistance.

While these polymers provide acceptable performance and exhibit good processability, it would be highly desirable to develop an EPDM rubber that exhibits sufficient dynamic mechanical endurance to allow for its use in the above-mentioned dynamic applications. To meet this target, EPDM has been blended with other elastomers exhibiting more favorable mechanical properties in order to develop a rubber having improved dynamic properties. These elastomers include polychloroprene, diene rubbers and organo-polysiloxane resins. In such cases, EPDM is added to improve the heat-, ozone- or oxygen resistance while maintaining or reducing the cost of the final composition. The effectiveness of these compounds is restricted by the fact that the proportion of EPDM that may be utilized is fairly limited in order to produce a compound with acceptable mechanical properties. In addition, the processing of such compounds is often troublesome and expensive.

Furthermore, the conditions necessary for acceptable curing of EPDM and other elastomers that may be used often conflict. The poor mixability and cure incompatibility of EPDM and highly unsaturated diene rubbers is demonstrated by the poor performance of the resulting composition in stress-strain tests. In fact, such compositions generally perform worse than either pure polymer. This poor performance is due in part to several factors. One cause is the difference in vulcanization rates. Optimal vulcanization for one of the rubbers will often lead to poor vulcanization of the other. This, combined with the preference of various accelerators for one polymer over the other, makes it difficult to achieve satisfactory vulcanization for both polymers. A second factor that contributes to poor vulcanization is the difficulty in achieving uniform dispersion between the two rubbers. Significantly, different solubility parameters produce poor compatibility between rubbers, resulting in difficulty when attempting to mix such rubbers to a uniform dispersion. This produces an inhomogeneous product with irregular and non-uniform properties. Traditional compatibilizers such as terpene resins and surface activated low molecular weight polymers have not been effective in mitigating this incompatibility.

In another approach, various additives have been tested in EPDM compounds to increase their tensile strength and fatigue resistance. Increasing the amount of reinforcing filler and peroxide has been shown to increase both hardness and modulus of the final rubber. However, the increase of filler has also been shown to correspondingly decrease the dynamic flex fatigue resistance of the resulting product. Furthermore, high levels of peroxide may decrease the tear strength of the final product. Zinc salts of (meth-)acrylic acids have also been added to EPDM in attempts to increase the wear resistance, tensile strength, modulus and lifetime of the elastomer under dynamic loading conditions, see e.g. WO96/13544 and EP964030. This approach is limited to peroxide cure and may negatively influence the compression sets. A further drawback is the limited compatibility of such zinc salts with the uncured EPDM which makes mixing very difficult.

A general problem for all of these methods is that they require additional expense and/or the compounds are at least relatively difficult to process.

Therefore, a need remains for an EPDM rubber suitable for dynamic applications that exhibits superior tensile and tear strength while maintaining weather, heat, oxygen and ozone resistance as well as ease of processing and moderate cost.

In WO03/020806 various EPDMs are used for the production of rubbers for dynamic applications, wherein the rubbers used are oil extended medium molecular weight elastomers. However, the polymers disclosed still show room for improvement with respect to the dynamic properties of their vulcanizates.

In U.S. Pat. No. 6,716,931 oil extended EPDM having quite a broad polydispersity of 3 to 5 is mentioned for dynamic applications. Vulcanizates made from such polymers with broad molecular weight distribution have the drawback that they have a high number of free dangling chain ends deteriorating the dynamic properties.

In EP621309 oil extended EPDM having an intrinsic viscosity of the EPDM of 2.8 to 3.7 (in Xylene at 70° C.) and an oil content of 30 to 50 phr. Due to the non-use of a reactivator in the catalyst system the rubbers described in this patent also have the drawback that they are inhomogeneous and have relatively high branching as mentioned e.g. in EP994906.

To date, an ethylene-alpha-olefin elastomeric composition which is readily processable, and with adequate and heat stable mechanical properties in dynamic applications, and which is highly resilient with excellent vibration isolation properties, to enable its use as the primary base elastomeric composition in applications such as mounts, in particular engine mounts, belting including power transmission and flat belting, air springs and the like has not been known.

Accordingly, it is an object of the present invention to provide an oil extended EPDM rubber for use as the primary elastomeric composition in articles subject to dynamic loading with good dampening, good aging, excellent dynamic properties, low tan 5 and adequate mechanical properties.

This objective is achieved with an oil extended ethylene-α-olefin-non-conjugated-diene copolymer composition consisting of
i) 100 parts of at least one ethylene-α-olefin-non-conjugated-diene copolymer having
a weight average molecular weight (Mw) of at least 300,000 g/mol.
an intrinsic viscosity higher than 4, preferably higher than 4.2, measured in Xylene at 70° C. and
a polydispersity (Mw/Mn) smaller than 3, preferably smaller than 2.8, in particular smaller than 2.6;
ii) 30 to 70 parts by weight per 100 parts by weight of the ethylene-α-olefin-non-conjugated-diene copolymer (i) of an extender oil and
iii) up to 5 parts by weight per 100 parts by weight of the ethylene-α-olefin-non-conjugated-diene copolymer (i) of auxiliary agents,
whereby the oil extended EPDM composition has a phase angle $\delta_{min}$ of lower than 2.5.

Ethylene-α-Olefin-Non-Conjugated-Diene Copolymer (i)

The preferred ethylene content, more precise spoken ethylene unit content, of the ethylene-α-olefin-non-conjugated-diene copolymer is 48 to 65% by weight of the polymer. Here, the "unit" means a polymerized monomer unit. For example, the "ethylene unit" means a polymerized ethylene unit.

Examples of the α-olefin of the ethylene-α-olefin-non-conjugated diene copolymer contained in the oil-extended copolymer used of the present invention are propylene, 1-butene, 1-pentene, 1-hexene, 4-methyl-1-pentene, 1-octene and 1-decene. Of these, propylene and 1-butene are preferred. Propylene is the most preferred.

In particular the α-olefin content is the balance to ethylene and the diene. Preferably the C2/α-olefin ratio is from 73/27 to 40/60, in particular from 68 to 32.

Preferably the "non-conjugated diene" of said copolymer means not only a non-conjugated diene but also a non-conjugated polyene such as a non-conjugated triene. Examples of such compounds are linear non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetraindene, 5-vinylnorbornene, 5-ethylidene-2-norbornene and 6-chloromethyl-5-isopropenyl-2-norbornene; trienes such as 2,3-diisopropylidene-5-norbornene, 2-ethylidene-3-isopropylidene-5-norbornene, 2-propenyl-2,2-norborna-diene, 1,3,7-octatriene and 1,4,9-decatriene; 5-vinyl-2-norbornene; 5-(2-propenyl)-2-norbornene; 5-(3-butenyl)-2-norbornene; 5-(4-pentenyl)-2-norbornene; 5-(5-hexenyl)-2-norbornene; 5-(5-heptenyl)-2-norbornene; 5-(7-octenyl)-2-norbornene; 5-methylene-2-norbornene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene and 4-ethylidene-12-methyl-1,11-pentadecadiene. These compounds may be used singly or in combination of two or more. A preferred compound is 5-ethylidene-2-norbornene or dicyclopentadiene or a combination of both.

Preferably the diene content is 3 to 7% by weight of the ethylene-α-olefin-non-conjugated-diene copolymer.

The ethylene-α-olefin-non-conjugated-diene copolymer (i) preferably does have a weight average molecular weight (Mw) measured by high temperature GPC of at least 300,000 preferred at least 400,000 g/mol, in particular from 400,000 to 700,000 g/mol. The intrinsic viscosity, measured in Xylene at 70° C., will preferably at least be 4.2

The polydispersity, namely, weight average molecular weight/number average molecular weight, measured by high temperature gel permeation chromatography of the ethylene-α-olefin-non-conjugated diene copolymer contained in the oil-extended composition is in the range of 2 to 2.8, preferably 2 to 2.5.

Extender Oil (ii)

The "extender oil" used in the present invention preferably means a petroleum softening agent conventionally used in the production of oil-extended rubber. Examples of the extender oil are paraffinic, naphthenic and aromatic extender oils obtained by purifying, and if necessary further processing, of high boiling fractions of petroleum. These extender oils generally show a dynamic viscosity of from 5 to 35 $mm^2/s$ at 100° C.

Preferred processing oils are paraffinic ones. A suitable paraffinic oil is e.g. Sunpar® 2280, available from Sunoco or clear paraffinic oil like Conopure® 12P, available from ConocoPhillips. Oils made via a gas to liquid (GTL) process, like e.g. Risella® X 430 from Shell, are also preferred.

Auxiliary Agents (iii)

Auxiliary agents are further ingredients of the oil extended ethylene-α-olefin-non-conjugated-diene copolymer like antioxidants (such as Irganox® 1076 from BASF), UV stabilizers, partitioning agents or processing aids (like talc or metal salts such as e.g. zinc, magnesium or calcium stearate) that will remain in the rubber after manufacturing. Their content in sum is preferably even quite low, in particular from 0 to 2, most preferably from 0 to 1 parts by weight per 100 parts by weight of the ethylene-α-olefin-non-conjugated-diene copolymer (i).

Phase Angle $\delta_{min}$

The phase angle $\delta_{min}$ is known by the man skilled in the art for instance in S. Trinkle, and C. Friedrich, Rheol. Acta, 40:322-328, 2001 and M. van Gurp, and J. Palmen, J. Rheol. Bull., 67:5-8, 1998. The $\delta_{min}$ value is a complex quantity which comprises several polymer properties such as the molecular weight, the monomer distribution, the polydispersity, the long-chain branching and the extender oil concentration. By combing these properties in a single parameter, $\delta_{min}$ is used to characterize the intrinsic dynamic properties of EPDM-based vibration isolation devices. The phase angle $\delta_{min}$ can be determined by conventional methods known to the man skilled in the art for instance mentioned in the above mentioned articles. In particular the measurement is as follows: Frequency sweeps are done in the range $10^{-2}$ to $10^3$ Hz (logarithmic scaling with 8 data points per decade of frequency) at −60, −50, −40, −30, −20, −10, 0, 10, 20, 40, 60, 80, 100, and 120 degree Celsius, respectively. To ensure that the applied stresses and deformations are within the limits of linear viscosity, a constant force of 0.5N is applied if the deformation of the sample is equal or less than 0.5 μm. Otherwise a constant deformation of 0.5 μm is used. The oscillatory measurements reveal the magnitude of the shear modulus, G*, and the loss factor, tan(δ). By plotting the phase angle, δ, versus G*, the van Gurp-Palmen plot is obtained. The minimum of δ(|G*|) reveals $\delta_{min}$. The phase angle $\delta_{min}$ preferably is lower than 2.3.

The oil extended ethylene-α-olefin-non-conjugated-diene copolymer composition of the present invention preferably has a Mooney viscosity ML(1+8)150° C. of 50 and 90 MU, in particular of 60 to 80 MU.

Process

A process for producing the ethylene-α-olefin-non-conjugated-diene copolymer (i) contained in the oil-extended copolymer of the present invention is not particularly limited. It can be produced by a slurry, solution or gas phase polymerization process using e.g. a conventional vanadium based catalyst or metallocene or post-metallocene catalysts. Suitable processes and catalysts are known in the literature.

The oil-extended EPDM composition of the present invention can be produced by a process wherein the extender oil is blended with the ethylene-α-olefin-non-conjugated-diene copolymer (i) during the production step thereof. The addition preferably takes place after the reactor but before the removal of volatiles, for instance before a steam stripper. More specifically, it is produced by a process wherein the extender oil is blended with the ethylene-α-olefin-non-conjugated-diene copolymer (i) which is dissolved or suspended in the reaction media coming from the polymerization reactor. The reason therefore is that in case of adding the oil later, it may result in failure to sufficiently blend the copolymer with the extender oil because of the high molecular weight of the ethylene-α-olefin-non-conjugated-diene copolymer (i) used in the present invention.

Vulcanizable Rubber Composition

The present invention also refers to a vulcanizable rubber composition comprising:
a) the oil extended ethylene-α-olefin-non-conjugated-diene copolymer composition according to the present invention,
b) 30 to 100 parts by weight per 100 parts by weight based on the ethylene-α-olefin-non-conjugated-diene copolymer (i) of the oil extended ethylene-α-olefin-non-conjugated-diene copolymer composition a) of a filler,
c) 0 to 30 parts by weight per 100 parts by weight based on the ethylene-α-olefin-non-conjugated-diene copolymer (i) of the composition a) of additional process oil, provided that the total amount of extender oil from the composition a) and additional process oil does not exceed 80 parts by weight per 100 parts by weight based on the ethylene-α-olefin-non-conjugated-diene copolymer (i) of the composition a) and
d) a vulcanizing agent.

Filler

Preferably the filler is used in an amount of 50 to 80 parts by weight per 100 parts by weight based on the ethylene-α-olefin-non-conjugated-diene (i). Preferred fillers are carbon black or inorganic fillers such as silica, calcium carbonate, talc and clay, which are conventionally used for rubber. The type of carbon black is classified according ASTM D-1765 for its particle size (BET in m²/g) and structure (DBP adsorption in cm³/100 g). Preferably carbon black fillers are used with a BET number in from 5 to 150, and DBP numbers in from 30 to 140. In the industry these type of carbon blacks are often designated to by abbreviations, such as MT, SRF, GPF, FEF, HAF, ISAF, SAF. The inorganic fillers may be surface treated with e.g. suitable silanes. Combinations of two or more of such fillers may be used. Most preferably used are carbon black and/or silanized silica.

Process Oil

As process oil the same as the extender oil can be used. Furthermore as process oil lubricating oil, paraffin, liquid paraffin, petroleum asphalt, vaseline, low molecular weight polyisobutylene or polybutylene, liquid EPDM or EPM, coal tar pitch, caster oil, linseed oil, beeswax, atactic polypropylene and cumarone indene resin can be mentioned. However, as the extender oil of the oil extended EPDM composition may be sufficient for the purpose of the present invention no further oil need to be added to form the vulcanizable rubber composition. If so the total oil content shall be limited to the 80 parts by weight per 100 parts by weight based on the ethylene-α-olefin-non-conjugated-diene copolymer (i) of the EPDM composition a). Preferred is the addition of 5 to 15 parts by weight of paraffinic extender oil per 100 parts by weight based on the ethylene-α-olefin-non-conjugated-diene copolymer (i). This paraffinic oil may be made according to a GTL process.

Vulcanizing Agent

Examples of the vulcanizing agent are sulfur; sulfur chloride; sulfur dichloride; 4,4'-dithiodimorpholine; morpholine disulfide; alkylphenol disulfide; tetramethylthiuram disulfide; selenium dimethyldithiocarbamate; and organic peroxides such as dicumyl peroxide, 2,5-dimethyl-2,5-di(t-butylperoxy)hexane, 2,5-dimethyl-2,5-di(benzoylperoxy)-hexane, 2,5-dimethyl-2,5-(t-butylperoxy)hexyne-3, di-t-butylperoxide, di-t-butylperoxide-3,3,5-trimethylcyclohexane and t-butylhydroperoxide. Of these, preferred are sulfur, dicumyl peroxide, di-t-butylperoxide and t-butylperoxide-3,3,5-trimethylcyclohexane.

In case of sulfur cure, sulfur is preferably used in an amount of 0.1 to 10 parts by weight, and preferably from 0.5 to 5 parts by weight, per 100 parts by weight of the ethylene-α-olefin-non-conjugated-diene (i).

In case of peroxide cure, the organic peroxide is used in an amount of usually from 0.1 to 15 parts by weight, and preferably from 0.5 to 8 parts by weight, per 100 parts by weight of said copolymer.

The vulcanizing agent may be used, if necessary, in combination with a vulcanization accelerator and a vulcanization coagent. Examples of the vulcanization accelerator are N-cyclohexyl-2-benzothiazole-sufenamide, N-oxydiethylene-2-benzothiazole-sulfen-amide, N,N-diisopropyl-2-benzothiazole-sulfenamide, 2-mercaptobenzothiazole, 2-(2,4-dinitrophenyl)mercaptobenzothiazole, 2-(2,6-diethyl-4-morpholinothio)benzothiazole, dibenzothiazyl-disulfide, diphenylguanidine, triphenylguanidine, di-o-tolylguanidine, o-tolyl-bi-guanide, diphenylguanidine-phthalate, an acetaldehyde-aniline reaction product, a butylaldehyde-aniline condensate, hexamethylenetetramine, acetaldehyde ammonia, 2-mercaptoimidazoline, thiocarbaniride, diethylthiourea, dibutylthiourea, trimethylthiourea, di-o-tolylthiourea, tetramethylthiuram monosulfide, teramethylthiuram disulfide, teraethylthiuram disulfide, terabutylthiuram disulfide, dipenta-methyl-enethiuram tetrasulfide, zinc dimethyldithiocarbamate, zinc diethyl-thiocarbamate, zinc di-n-butylthiocarbamate, zinc ethylphenyldithiocarbamate, zinc butyl-phenyl-dithiocarbamate, sodium dimethyldithiocarbamate, selenium dimethyl-dithiocarbamate, tellurium diethyldithiocarbamate, zinc dibutylxanthate and ethylenethiourea. The vulcanization accelerator if used is used preferably in an amount of from 0.1 to 20 parts by weight, and in particular from 0.2 to 10 parts by weight, per 100 parts by weight of the ethylene-α-olefin-non-conjugated-diene (i).

Examples of the vulcanization coagent are metal oxides such as magnesium oxide and zinc oxide. Of these, preferred is zinc oxide. The vulcanization coagent is used usually in an amount of from 2 to 20 parts by weight per 100 parts by weight of the ethylene-α-olefin-non-conjugated-diene (i).

When peroxides are used as the vulcanizing agent, examples of cross-linking coagent or activator are cyanurate compounds, such as triallyl cyanurate (TAC) and triallylisocyanurate (TAIC), (meth)acrylate compounds, such as trimethylolpropane-trimethacrylate (TMPT or TRIM) and ethyleneglycloldimethacrylate (EDMA), zinc-dimethacrylate (ZDMA) and zincdiacrylate (ZDA), divinylbenzene, p-quinonedioxime, m-phenylene dimaleimide (HVA-2), (high vinyl) polybutadiene, and combinations thereof. When peroxides are used as the vulcanizing agent in addition, preferably sulphur (elementary or as part of sulphur accelerators or donors) can be used to obtain so called hybrid curing systems. These curing systems combine high heat resistant properties, typical for peroxide cure, with very good ultimate properties, such as tensile and tear, as well as excellent dynamic and fatigue properties typically associated with sulphur curing systems. Applied dosing levels of sulphur are preferably from 0.05 to 1.0 parts by weight, preferably from 0.2 to 0.5 parts by weight per 100 parts by weight based on the ethylene-α-olefin-non-conjugated-diene copolymer (i).

The vulcanizable rubber composition might in addition also contain other ingredients, such as antioxidants (e.g. TMQ), dessicants (e.g. CaO), tackyfiers (e.g., resin), bonding agents, pigments, process aids (e.g. factice, fatty acids, stearates, poly- or di-ethylene glycol). The present invention also relates to a vulcanized rubber article made from the vulcanizable rubber composition of the present invention. Such a vulcanized rubber article is preferably an engine mount.

The present invention also relates to a process for forming a vulcanized rubber article comprising the steps processing a rubber composition according to the present invention to form the final shape of the molded article and curing said rubber composition.

Such a process preferably comprises, for example, the steps of (i) kneading a the oil-extended EPDM composition of the present invention, a vulcanizing agent, a filler and, if necessary, the above-mentioned other ingredients, with a conventional kneading machine such as an open roll mill, an internal mixer, a kneader and an extruder to obtain a mixed product, and (ii) vulcanizing (cross-linking) the resulting kneaded product under heating. Such a mixing process can be done in one or more steps as known to a man skilled in the art.

The vulcanized rubber articles in accordance with the present invention can be used the most suitably for rubber vibration insulator such as an engine mount and a muffler hanger or other articles intended for used in dynamic applications such as flexible couplings and torsional vibration dampers but also belts, air springs and bridge bearings.

EXAMPLES

Measurements
Phase Angle δ

The rheological measurements are accomplished using a DMA/STDA 861e instrument from Mettler-Toledo. The EPDM samples have a thickness of 1 millimeter and a diameter of 6 millimeter. Two samples are mounted symmetrically in a double shear sandwich sample holder. The temperature of the furnace is controlled to an accuracy of 0.5 degree Kelvin using liquid nitrogen and electric heaters. To characterize the polymer dynamic properties, frequency sweeps are done in the range from $10^{-2}$ to $10^3$ Hz (logarithmic scaling with 8 data points per decade of frequency) at −60, −50, −40, −30, −20, −10, 0, 10, 40, 60, 80, 100, and 120 degree Celsius, respectively. The applied stresses and deformations are within the limits of linear viscosity. If the deformation of the sample is equal or smaller than 0.5 µm a constant force of 0.5N is applied. Otherwise a constant deformation of 0.5 µm is used. The oscillatory measurements reveal the magnitude of the shear modulus, $G^*$, and the loss factor, $\tan(\delta)$. Plotting the phase angle, δ, versus $|G^*|$ gives the so-called van Gurp-Palmen (vGP) plot as can be seen in FIG. 1. See also M. van Gurp, and J. Palmen, J. Rheol. Bull., 67:5-8, 1998.

FIG. 1 shows the vGP-plot for the oil modified EDPM of example 1. The vGP-plot clearly shows a minimum in $\delta(|G^*|)$. The minimum, $\delta_{min}$, is a complex quantity which comprises several polymer properties such as the molecular weight, the polydispersity, the long-chain branching see S. Trinkle, and C. Friedrich, Rheol. Acta, 40:322-328, 2001, and the extender oil concentration.

EXAMPLE 1

Preparation of an Oil Extended Polymer

A terpolymer of ethylene, propylene, and 5-ethylidene-2-norbornene (ENB) was produced using a catalyst system comprising vanadium trisacetylacetonate (V(acac)$_3$) as the catalyst, aluminumalkylhalide (diethylaluminum chloride (DEAC)) as the cocatalyst, and trichloro acetic acid ethyl ester (ETA) as the catalyst activator. The C2/C3 ratio of the copolymer and the diene content can be seen from table 1.

A continuous polymerization reaction was run in a reactor provided with agitation and fitted with an evaporative cooling device. The reactor was first charged with propylene, ENB, ethylene and butane, and the reactor contents were allowed to equilibrate at temperature of 12° C. The condensed volatiles from the evaporative cooling device were fed back to the reactor. Subsequent beds with 3 A and 13× molecular sieves were used to clean and dry this stream and to remove especially oxygenated impurities that would diminish catalytic activity and polymer properties.

Continuous flows of gaseous ethylene, a 1 weight percent solution of DEAC in cyclohexane and a 0.2 weight percent solution of V(acac)$_3$ in toluene (containing in addition the activator at a molar ratio of 4:1 of activator to vanadium) were then fed to the reactor. Molar ratio of DEAC to V(acac)$_3$ was 22 to 1.

The pressure of the reactor contents was periodically adjusted to about 71 psig in order to maintain the temperature at 12° C. The onset of the reaction usually took 10-20 minutes from the start of the addition of catalyst and cocatalyst flows. Thereafter, the reactor was put into a continuous mode of operation with continuous flows of the monomers. The Mooney was controlled by adding about 100 ppm diethyl zinc.

The reactor feed recipe used was based on the molar ratio of the various components to 100 moles propylene and is set out in Table 1. The mean residence time of the reactants was 1 hour. The polymer slurry was collected in a vessel containing water. At the same time, a solution of Irganox 1076 in hexane and clear extender oil Conopure® 12P was continuously added to the vessel in an amount that the oil content of the final oil extended rubber was 50 phr and the Irganox 1076 content was 0.3 parts by weight per 100 parts by weight based on the ethylene-α-olefin-non-conjugated-diene copolymer (i).

The polymer slurry was subsequently stripped with steam in order to remove residual hydrocarbons and the polymer product was then dried. The polymer produced by the above process was analyzed for its composition and Mooney viscosity.

The Mw was 470 kg/mol, Mn was found to be 205 kg/mol. The polydispersity (PDI) was 2.3. The $\delta_{min}$ is 1.9. The Mooney viscosity ML(1+8) 150° C. is 67 MU. The polymer sample of exp 1 exhibit an intrinsic viscosity measured in Xylene at 70° C. of 4.4 (dl/g).

TABLE 1

| | δmin [°] | Mw [kg/mol] | Mn [kg/mol] | PDI [—] | C2/C3 ratio [—] | ENB [wt %] | oil phr | IV [—]** |
|---|---|---|---|---|---|---|---|---|
| exp. 1 | 1.90 | 470 | 205 | 2.3 | 1.9 | 5.5 | 50 | 4.8 |
| Keltan 5469 Q | 2.63 | 540 | 220 | 2.5 | 1.6 | 4.0 | 100 | 4.0 |
| Keltan DE304 | 3.18 | 460 | 160 | 2.9 | 2 | 7.8 | 75 | 3.9 |
| Vistalon 8800 | 4.15 | —* | —* | 3.0 | 1.5 | 10.0 | 15 | <3 |

*values unknown
**intrinsic viscosity measured in Decaline at 135° C.

In Table 1, 5 min is given for several different commercial EPDM-grades and determined according to the above given method. Conventional EPDMs exhibit $\delta_{min}$-values from about 2.6 to 4.1 degree. In contrast, the oil modified EDPM of example 1 has an extremely low value of only 1.9 degree. The Keltan® grades were all products of DSM or Lanxess and Vistalon® is a product of ExxonMobil.

Preparation of a Vulcanizable Rubber Composition
Ingredients:

Various vulcanizable rubber composition based on different oil extended EPDM compositions were prepared. The ingredients used for the various compound evaluations are listed in table 2.

TABLE 2

Summary of Ingredients

| Ingredient | Identity | Supplier |
|---|---|---|
| Vulkanox 4010 | Antioxidant (a p-phenylenediamine type) | Lanxess |
| Vulkanox ZMB2/C5 | Antioxidant (a mercapto-benzimidazole type) | Lanxess |
| Irganox ® 1076 | phenolic antioxidant | BASF |
| Spheron 5000A | carbon black | Cabot |
| Corax ® N 774 | carbon black | Orion Carbon |
| SUNPAR ® 2280 | paraffinic oil | Sunoco |
| Conopure ® 12P | paraffinic oil | ConocoPhillips |
| EDENOR ® C 18 98-100 | stearic acid | Oleo Solutions Ltd |
| ZINKOXYD AKTIV | zinc oxide | Lanxess |
| RHENOFIT TRIM/S | Tri methylol propane trimethacrylate (co-agent) | Lanxess |
| PERKADOX 14-40 | 40% di-(tertbutylperoxyisopropyl)benzene | AkzoNobel |
| RHENOFIT 3555 | Triethanolamine (vulcanization activator) | Rhein Chemie Rheinau |
| RHENOGRAN ® S-80 | 80% sulfur | Rhein Chemie Rheinau |
| RHENOGRAN ® CBS-80 | 80% N-Cyclohexyl-2-benzothiazosulfenamide | Rhein Chemie Rheinau |
| RHENOGRAN ® MBT-80 | 80% 2-mercaptobenzothiazole | Rhein Chemie Rheinau |
| RHENOGRAN ® TMTD-70 | 70% tetramethylthiuram disulfide | Rhein Chemie Rheinau |

All compounds were prepared on a laboratory internal mixer (GK1,5 E1 from Harburg-Freudenberger Maschinenbau GmbH; ram pressure 7 bar, 45 rpm, 70% degree of filling, mixing time 4 min); chemicals of the curing system were added on an open mill having 200 mm diameter of the rolls (20 rpm, 40° C. roll temperature, friction 1.22).

Test specimen have been prepared for all compounds by curing test plates of 2 mm and 6 thickness at 180° C. to a time equivalent to t95 (t95 is the time to reach 95% of maximum torque during the MDR measurement)

Various processing, physical and dynamic mechanical properties were measured. The tested properties in the various trials were measured in accordance with the following test methods listed in Table 3.

TABLE 3

Test Methods.

| Name of method: | Standard: |
|---|---|
| Mooney Viscosity ML 1 + 4 at 100° C. S21 ML 1 + 4/100 [MU] Mooney Relaxation [%] MSR [MU/s] T5 (5% rise from min. viscosity) | ASTM D1646 |
| Mooney Viscosity ML 1 + 4 at 120° C. ML 1 + 4/125 [MU] Mooney Relaxation [%] MSR [MU/s] T5 (5% rise from min. viscosity) | ASTM D1646 |
| Mooney Viscosity ML 1 + 8 at 150° C. ML 1 + 4/125 [MU] Mooney Relaxation [%] MSR [MU/s] T5 (5% rise from min. viscosity) | ASTM D1646 |
| MDR 180° C. 20 min S16 ML (Minimum torque) MH (Maximum torque) | ASTM D5289 |

TABLE 3-continued

Test Methods.

| Name of method: | Standard: |
|---|---|
| Ts2 (Time to 1dNm rise above ML) | |
| T90 (Time to 90% of maximum torque) | |
| Hardness [Shore A] | DIN 53505 |
| hot air 115° C., 0, 7 d | |
| hot air 125° C., 0, 42 d | |
| Tensile strength (before and after storage) | ASTM D412 |
| hot air 115° C., 0, 7 d | |
| hot air 125° C., 0, 42 d | |
| Tear strength (Graves not cutted) | ASTM D624 |
| Compression Set | DIN ISO 815 |
| CS −10° C. 22 h 13 d × 6, 3 mm | |
| CS 23° C. 72 h 13 d × 6, 3 mm | |
| CS 100° C. 22 h 13 d × 6, 3 mm | |
| CS 125° C. 72 h 13 d × 6, 3 mm | |
| Rebound resilience (23° C. PV 110) | DIN 53512 |
| Dynamic flex fatigue test | DIN 53522 |
| A rubber strip with a semi-cylindrical recess is bended as described in DIN 53522. Due to the strong compression, the specimen buckles. This buckling causes a great elongation of the rubber material in the recess, which can lead to the formation of cracks. The number of bends is measured until the formation of cracks is visible. The test is undertaken at 23° and 250° C.. | |
| Eplexor | |
| The measurement is carried out with a Eplexor dynamic-mechanical analyser from Gabo Quali-meter Testanlagen GmbH. A cylindrical specimen having a height and a diameter of 10 mm, respectively, is periodically compressed with a frequency of 10 Hz. The specimen is deformed applying a pre-load of 15N and a force amplitude of +/− 10 N. The temperature is set to 23° C.. | |
| MTS | |
| A dynamic-mechanical analyser from MTS is used. The specimens are 6 mm in height and 20 mm in diameter. A double shear sandwich sample holder is applied where two samples are mounted symmetrically. The sample holder is placed in a furnace tempered to 23° C. for at least 30 min before the measurement is started. The linear viscoelastic properties of the rubber materials are measured in simple shear geometry for frequencies in the range from 0, 1 to 200 Hz (logarithmic scaling with 8 data points per decade). A peak-to-peak amplitude of 0.3 mm is applied. | |

Compounding Results; Example 1

Various experimental trials were done to compare the properties of the vulcanizates based on the vulcanizable rubber compositions as given in table 4 based on various oil extended EPDMs in particular in view of rubber compositions as based on Keltan DE304 Vistalon 8800 as defined in WO03/020806.

TABLE 4

Rubber stiffness and reinforcement

| | phr | phr | phr | phr |
|---|---|---|---|---|
| Exp 1 | 150 | | | |
| Vistalon 8800 | | | 115 | |
| Keltan DE 304 | | 175 | | |
| Keltan 5469 Q | | | | 200 |
| ZnO aktiv | 5 | 5 | 5 | 5 |
| Stearic acid | 2 | 2 | 2 | 2 |
| Corax N774 | 60 | 60 | 50 | 120 |
| Sunpar 2280 | 15 | 5 | 30 | 5 |
| Rhenogran S-80 | 0.64 | 0.64 | 0.64 | 0.64 |
| Rhenogran TMTD-70 | 1.25 | 1.25 | 1.25 | 1.25 |
| Rhenogran MBT-80 | 0.42 | 0.42 | 0.42 | 0.42 |
| | | | | |
| Total | 234.31 | 249.31 | 204.31 | 334.31 |
| Hardness [ShA] | 45 | 40 | 44 | 44 |
| Modulus @ 100% elongation [Mpa] | 1 | 0.8 | 0.9 | 1 |
| Tan Delta [degrees] | 0.077 | 0.084 | 0.134 | 0.110 |
| Rebound Resilience [%] | 78 | 75 | 59 | 57 |

Key performance criteria for rubber mounts is vibration isolation, i.e. the lowest possible loss angle Delta (or Tan Delta, see table above) at a defined strain and for a given range of frequencies. In other words, a tan delta value of zero refers to an "ideal" elastic material. Such a material exhibit high resilience values, ideally 100%.

Polymer type Exp1 shows the best overall performance with the lowest Tan delta values and the highest rebound resilience compared to polymer type Vistalon 8800 and Keltan DE 304. This is in accordance with the $\delta_{min}$ value for both polymer types, which is the lowest for Exp 1.

An important design parameter is the stiffness (or "spring constant") of the rubber mount. In practical terms it is often referred to the hardness or modulus at low elongation (i.e. the tangent at zero strain in the stress/strain curve) of the rubber material. Dynamic performance comparisons should therefore ideally be done for the same stiffness, i.e. hardness level. In EPDM compounding, the required hardness level is achieved through the reinforcement mechanism of appropriate fillers, such as carbon black. However, it is well-known that a high level of carbon black leads to higher tan delta values with poorer vibration isolation performances.

In the examples above (table 4) it can be seen that polymer type Keltan 5469Q with 100 oil extension needs to be compounded with more carbon black (120 phr instead of 60 to reach 45 ShA hardness (or a Modulus @ 100% elongation of 1.0 MPa). And although this polymer type exhibit a fairly high Mw and narrow MWD, its dynamic performance level is only moderate as can be concluded by its moderate $\delta_{min}$ value.

The same argument holds for polymer type DE304 with 75 phr oil extension, that in fact resulted in a too low hardness level (only 40 ShA). Even though for this polymer would need to be compounded with higher filler levels of carbon black for obtaining the same level of hardness/stiffness, which would consequently further deteriorate the dynamic performances, i.e. higher tan delta values will be obtained.

In case of polymer type Vistalon 8800 with only 15 phr oil extension, the total level of carbon black can be lower, but nevertheless poor dynamic properties (highest tan delta value) are obtained due to the overall low Mw and relatively high PDI.

In all cases, the relative dynamic performance of the oil extended EPDMs according to the present invention with a certain low $\delta_{min}$ value, an EPDM type for optimal vibration isolation performances can be obtained.

Compounding Results; Example 2

Additional trials were done to compare different curing systems for retaining a minimum set of mechanical properties at a test temperature of 115° C. At this temperature the Natural Rubber reference sample was fully deteriorated after 7 days exposure.

TABLE 5

Mechanical properties of different curing systems, before and after heat ageing at 115° C..

| | phr | phr | phr |
|---|---|---|---|
| Exp 1 | 150 | 150 | 150 |
| ZnO aktiv | 5 | 5 | 5 |
| Stearic acid | 1 | 1 | 1 |
| Spheron 5000A | 50 | 50 | 50 |
| Sunpar 2280 | 10 | 10 | 10 |
| Vulkanox ZMB2/C5 | 1 | 1 | 1 |
| Vulkanox 4010 | 1 | 1 | 1 |
| Perkadox 14-40 | | 6.00 | 5.00 |
| Rhenofit TRIM/S | | 1.40 | |
| Rhenofit 3555 | 0.60 | | |
| Rhenogran S-80 | 0.80 | | 0.30 |
| Rhenogran TMTD-70 | 2.57 | | |
| Rhenogran CBS-80 | 1.00 | | |
| Rhenogran MBT-80 | | | |
| Total | 222.97 | 225.4 | 223.3 |
| Hardness [ShA] | 48 | 48 | 46 |
| Tan delta [degrees] | 0.069 | 0.075 | 0.079 |
| Tensile Strength [MPa] | 22.3 | 15.0 | 22.4 |
| rel. change @ 7 days/115 C ageing [%] | −40 | 9 | −2 |
| Elongation [%] | 685 | 542 | 721 |
| rel. change @ 7 days/115 C ageing | −21 | 4 | −1 |
| Compression set 22 hr/100 C [%] | 17 | 10 | 13 |

An adequate set of mechanical properties comprises of a tensile strength of 20 MPa or more and an elongation at break of 600% or higher.

From table 5, it can be concluded the both the (conventional) sulphur curing system, as well as the hybrid cure system (0.24 sulphur on 2.0 peroxide) exhibit very good mechanical properties, whereas the peroxide cured system (with TRIM as co-agent/activator) showed inferior mechanical properties. In addition both aforementioned best-in-class curing systems reach more than 10000 kcycles without failure in a dynamic flex fatigue test, whereas the peroxide cure system showed early failures.

In addition, the hybrid cure system showed excellent heat stability performances, with virtually no changes in tensile strength and elongation at 7 days/115° C. heat ageing.

The invention claimed is:

1. An oil extended ethylene-α-olefin-non-conjugated-diene copolymer composition consisting of;
   i) 100 parts by weight of at least one ethylene-α-olefin-non-conjugated-diene copolymer having:
   a weight average molecular weight (Mw) of 400,000 to 700,000 g/mol;
   an intrinsic viscosity higher than 4 measured in Xylene at 70° C.; and
   a polydispersity (Mw/Mn) smaller than 3;
   ii) 30 to 70 parts by weight per 100 parts by weight of the ethylene-α-olefin-non-conjugated-diene copolymer (i) of an extender oil; and
   ii) up to 5 parts by weight per 100 parts by weight of the ethylene-α-olefin-non-conjugated-diene copolymer (i) of auxiliary agents,
   whereby the oil extended copolymer composition has a phase angle $\delta_{min}$ of lower than 2.5, and a Mooney Viscosity ML(1+8)150° C. of 50 and 90 MU.

2. The oil extended copolymer composition according to claim 1, wherein a ratio of ethylene units to α-olefin units in the ethylene-α-olefin-non-conjugated-diene copolymer is 73/27 to 40/60.

3. The oil extended copolymer composition according to claim 1, wherein the non-conjugated diene is selected from the group consisting of 1,4-hexadiene, 1,6-octadiene, 2-methyl-1,5-hexadiene, 6-methyl-1,5-heptadiene and 7-methyl-1,6-octadiene; cyclic non-conjugated dienes; trienes; 5-vinyl-2-norbornene; 5-(2-propenyl)-2-norbornene; 5-(3-butenyl)-2-norbornene; 5-(4-pentenyl)-2-norbornene; 5-(5-hexenyl)-2-norbornene; 5-(5-heptenyl)-2-norbornene; 5-(5-heptenyl)-2-norbornene; 5-(7-octenyl)-2-norbornene; 5-methylene-2-norbornene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene, and 4-ethylidene-12-methyl-1,11-pentadecadiene.

4. The oil extended copolymer composition according to claim 1, wherein the α-olefin is selected from the group consisting of propylene, 1-butene, 1-pentene, 1-hexene, 4-methyl-1-pentene, 1-octene and 1-decene.

5. The oil extended copolymer composition according to claim 1, wherein the extender oil is selected from the group consisting of paraffin, naphthene and aromatic extender oils obtained by purifying high boiling fractions of petroleum.

6. A vulcanizable rubber composition comprising:
   a) the oil extended copolymer composition according to claim 1,
   b) 30 to 100 parts by weight filler per 100 parts by weight based on the ethylene-α-olefin-non-conjugated-diene (i) of the oil extended copolymer composition a),
   c) 0 to 30 parts by weight process oil per 100 parts by weight based on the ethylene-α-olefin-non-conjugated-diene copolymer (i) of the composition a), provided that the total amount of extender oil from the composition a) and process oil does not exceed 80 parts by weight per 100 parts by weight based on the ethylene-α-olefin-non-conjugated-diene copolymer (I) of the composition a), and
   d) a vulcanizing agent.

7. A vulcanized rubber article comprising vulcanized rubber composition according to claim 6.

8. A vulcanized rubber article according to claim 7, wherein the article is an engine mount.

9. A process for forming a vulcanized rubber article, the process comprising:
   processing the rubber composition according to claim 6 to form the final shape of the molded article; and
   curing the rubber composition.

10. An oil extended ethylene-α-olefin-non-conjugated-diene copolymer composition comprising:
    i) at least one ethylene-α-olefin-non-conjugated-diene copolymer having
    a weight average molecular weight (Mw) of 400,000 to 700,000 g/mol;
    an intrinsic viscosity higher than measured in Xylene at 70° C.; and
    a polydispersity (Mw/Mn) smaller than 3; and
    ii) an extender oil,
    whereby the oil extended copolymer composition has a phase angle $\delta_{min}$ of lower than 2.5, and a Mooney viscosity ML(1+8)150° C. of 50 and 90 MU.

11. The oil extended copolymer composition according to claim 10, wherein the oil extended copolymer comprises 30 to 70 parts by weight of the extender oil per 100 parts by weight of the copolymer (i).

12. The oil extended copolymer composition according to claim 11, further comprising up to 5 parts by weight of auxiliary agents per 100 parts by weight of the copolymer (i).

13. The oil extended copolymer composition according to claim 10, wherein:

the non-conjugated diene is selected from the group consisting of 1,4-hexadiene, 1,6-octadiene, 2-methyl-1,5-hexadiene, 6-methyl-1,5-heptadiene, 7-methyl-1,6-octadiene; cyclic non-conjugated dienes; trienes; 5-vinyl-2-norbornene; 5-(2-propenyl)-2-norbornene; 5-(3-butenyl)-2-norbornene; 5-(4-pentenyl)-2-norbornene; 5-(5-hexenyl)-2-norbornene; 5-(5-heptenyl)-2-norbornene; 5-(7-octenyl)-2-norbornene; 5-methylene-2-norbornene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene and 4-ethylidene-12-methyl-1,11-pentadecadiene; and the α-olefin is selected from the group consisting of propylene, 1-butene, 1-pentene, 1-hexene, 4-methyl-1-pentene, 1-octane and 1-decene.

14. The oil extended copolymer composition according to claim 13, wherein the extender oil is selected from the group consisting of paraffin, naphthene, and aromatic extender oils obtained by purifying high boiling fractions of petroleum.

15. The oil extended copolymer composition according to claim 14, wherein:

the ethylene-α-olefin-non-conjugated-diene copolymer has a diene content of 3 to 7% by weight, an intrinsic viscosity greater than 4.2, and a polydispersity of 2 to 2.5;

the non-conjugated diene is dicyclopentadiene, or a combination thereof;

the α-olefin is propylene;

the oil extended ethylene-α-olefin-non-conjugated-diene copolymer composition additionally comprises up to 5 parts by weight of auxiliary agents; and the extender is a paraffinic oil.

16. The oil extended copolymer composition according to claim 15, wherein:

the ethylene-α-olefin-non-conjugated-diene copolymer composition additionally comprises up to 1 part by weight of auxiliary agents selected from antioxidants, UV stabilizers, partitioning agents and processing aids.

* * * * *